Feb. 24, 1970   C. F. FERGUSON   3,496,609
UNIVERSAL VULCANIZING MOLD

Filed Oct. 3, 1967   2 Sheets-Sheet 1

INVENTOR.
CHARLES F. FERGUSON
BY Philip Schneider
Louis B. Applebaum
ATTORNEYS

Feb. 24, 1970     C. F. FERGUSON     3,496,609
UNIVERSAL VULCANIZING MOLD

Filed Oct. 3, 1967     2 Sheets-Sheet 2

INVENTOR.
CHARLES F. FERGUSON
BY Philip Schneider

ATTORNEYS

United States Patent Office 3,496,609
Patented Feb. 24, 1970

3,496,609
UNIVERSAL VULCANIZING MOLD
Charles F. Ferguson, Mystic, Conn., assignor to the United States of America as represented by the Secretary of the Navy
Filed Oct. 3, 1967, Ser. No. 672,646
Int. Cl. B29d 3/00
U.S. Cl. 18—36                                    5 Claims

ABSTRACT OF THE DISCLOSURE

An injection mold for vulcanizing the insulation of an electrical cable to a tapered, metal flange mount. The mold has a removable central core assembly comprising a plurality of centrally excised wafers and a pair of centrally grooved blocks. The wafers are selected from a set of wafers whose central excisions are graduated in size and the blocks are similarly selected from a set of blocks whose central grooves are graduated in size. The cable fits into the grooves in the block and the tapered portion of the flange mount fits into the excisions in the wafers. By selecting blocks with suitably sized grooves and wafers with suitably sized excisions, differently sized cables and flange mounts can be vlucanized to each other without having to machine a different mold for each individual job.

---

The invention described herein may be manufactured and used by or for the Government of the United States of America for governmental purposes without the payment of any royalties thereon or therefor.

This invention relates to injection molds and especially to a single universal injection mold which can handle the vulcanizing of variously sized electrical cables to variously sized, tapered flange mounts.

In the electronic arts, it is frequently necessary to run electrical cables through flange mounts and the rubber insulation around the cables must be vulcanized to the tapered portion, or spur, of the flange mount for a well-insulated, strong connection. However, cables come in variously sized outer diameters and spurs also come in various sizes and each particular combination of cable and flange mount requires the machining of a specific mold which fits that combination. The machining of a mold takes about a week and it would be desirable to have a single mold which would be adjustable to a variety of differently sized combinations of cables and mounts so that vulcanizing of a range of variously sized combinations can be accomplished without delay.

An object of the invention is to provide a single injection mold which can be used to provide a thermoplastic covering for a tapered flange mount and to mold this covering with the thermoplastic insulation of an electrical cable.

Another object is to enable an injection mold of the type above described to operate upon different combinations of cables having variously sized outside diameters which lie in a certain range and flange mounts having variously sized, tapered spurs.

A further object is to permit a molded connection to be made between variously sized cables and variously sized, tapered spurs of flange mounts without having to machine a different injection mold for each combination of sizes.

The objects and advantages of the present invention are accomplished by using a removable central section in an injection mold. The central section is an assembly composed of split, centrally grooved, cable-enclosing means for holding the cable and split, centrally grooved, spur-enclosing means. The cable-enclosing means and the spur-enclosing means are selected from a set of each, the sets being graduated in size with respect to the central excision in each member of the sets.

Other objects and advantages will appear from the following description of an example of the invention, and the novel features will be particularly pointed out in the appended claims.

Figure 1:
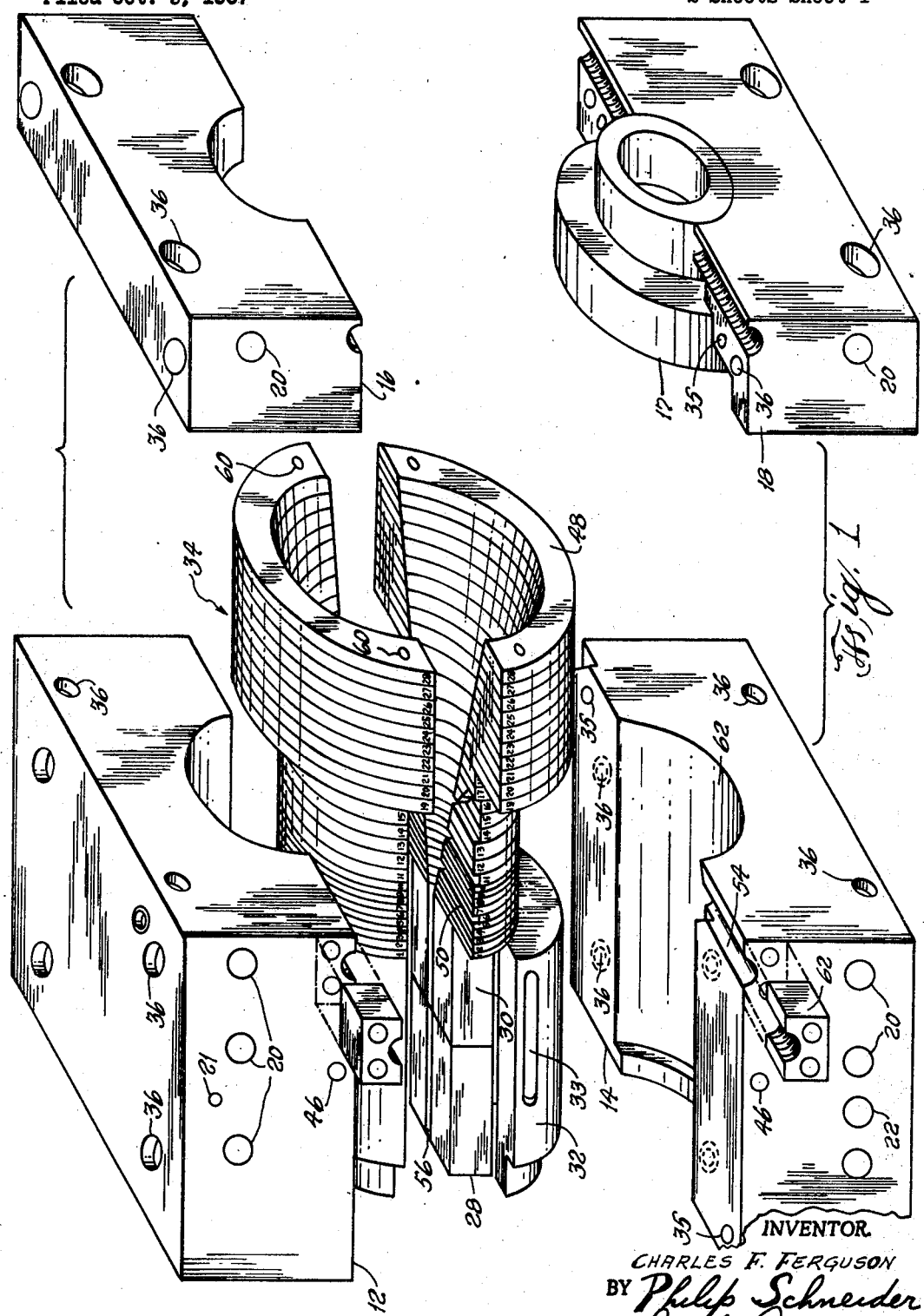
FIG. 1 is an isometric, semi-exploded view of the invention.

A semi-exploded view of the invention is shown in FIG. 1. The invention comprises an injection mold having an upper section 12 and a lower section 14, a central core assembly having upper and lower sections, and a flange-centering means having an upper section 16, a lower section 18 and a middle section 17.

Figure 3:
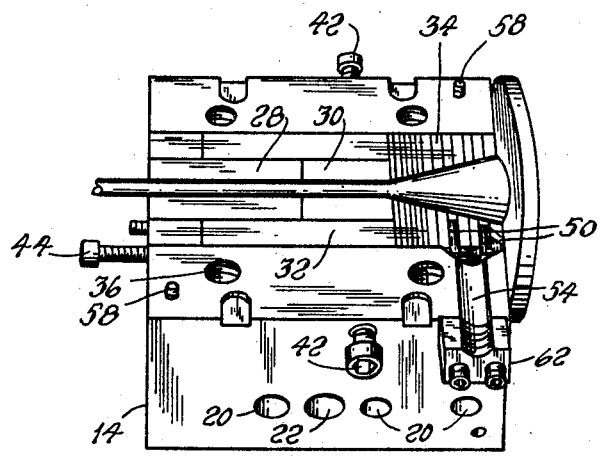
FIG. 3 is an illustration of how a cable and flange mount might fit into the lower section of the central core assembly and how the central core assembly might fit into the lower section of the mold for one specific size of central core assembly, the size being determined by the number of wafers and the particular wafers which are used.
Figure 4:
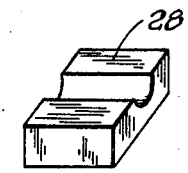
FIG. 4 is an isometric view of a cable-sleeve block.

The upper and lower sections of the mold are formed with holes for heaters, centering-pins and bolts, 20, 35 and 36, respectively. The lower section 14 has a hole 22 for a thermostat and a pair of locking-screw holes 46, one of which can be seen at the front of the section 14 in FIG. 1 and the other of which is at the rear of the section 14 and cannot be seen. A hole for a position-adjusting screw 44 is at the left side of the lower section 14 and cannot be seen in FIG. 1 but FIG. 3 shows the position-adjusting screw 44 and indicates its location. The upper section 12 also has two locking-screw holes 46 and a thermometer hole 21.

Figure 2:
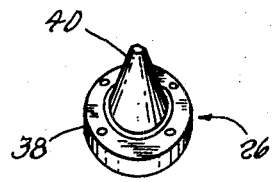
FIG. 2 is an isometric view of a typical flange mount.

FIG. 2 shows one type of flange mouth 26 which consists of two sections, a flange 38 and a tapered spur 40. Spur tapers are usually about 15 degrees for undersea cable applications. The flanges come in various sizes and the spurs come in different lengths and end diameters. It is frequently necessary to put an electrical cable through a flange mount; to do this, a rubber covering has to be vulcanized to the outside area of the tapered spur 40 and this covering must be bonded to the outer rubber covering of the cable. However, since the cables (outside diameter) and the flange mounts come in different sizes, it has heretofore been necessary to machine a specific mold for each bonding job. The central core assembly used in this invention permits this mold to be used with variously sized combinations of cable and flange mounts within a given range of sizes.

The central core section will be described in terms of its lower half; it will be understood that the upper half forms a mirror image of the lower half except where it is specifically stated to be otherwise. The central core section is an assembly of an outer or heat-insulating cable-sleeve section 28, an inner or heat-conducting cable-sleeve section 30, a cable-sleeve section holder 32 and a wafer section 34 selected from a set of wafers 48. Each wafer 48 is semicircular in shape and has a semicircular central excision, the excisions being graduated in size to form 15 degree edges when the wafers are arranged in order from the smallest excision, which is 3/16 inch in diameter, to the largest excision, which is 3¼ inches in diameter. FIG. 1 shows a typical set of wafers, in this case being twenty-eight in number, numbers 1 through 10 being ⅛ inch in thickness and the rest being ¼ inch in diameter. The reason that the wafers with the smaller excisions are thinner than the rest is that this permits a better fit of these wafers to cables with small outside diameters.

Some of the wafers are undercut 50 on one side of the central excision; for example, in this set numbers 6, 11 and 14 are undercut completely and numbers 15 and 16 are undercut incompletely, having an oblique shoulder 52 at the rear edge. The slots formed by the undercuts provide channels for semiliquified rubber to be forced from the injector channel 54 into the central area within the wafer section 34. More than one slot is needed since the right-left position (as seen in FIG. 1) of the central core assembly has to be changed according to the cable-flange combination which is being molded and at least one slotted wafer section must be in register with the injector channel 54 for rubber to be injected into the central core cavity. The wafers in the upper section of the core assembly are not slotted.

The cable-sleeve sections 28 and 30 are rectangular blocks with semicircular grooves 56 on the upper surface. The blocks form a set with grooves which graduate in size from 3/16 inch to 1 3/8 inches in diameter. The blocks are placed in position in the cable-sleeve holder 32, the proper number of wafers 48 is affixed to block 30 by means of pins or rods which pass through the wafers into the block and the assembly is placed in the groove 62 in the lower secton 14 of the mold. After the proper location of the core assembly is determined and the position-adjusting screw 44 is set for this position, the holding screws 42 are screwed into the holding-screw slots 33 in the cable-sleeve holder 32 and the central core assembly is now held fast to the mold section.

The cable-sleeve sections can be called the cable-enclosing means and the wafer section can be called the spur-enclosing means.

It should be noted that the set of wafers shown in FIG. 1 is the complete set and that a smaller set is usually selected for any given job; only an extremely long spur would require the complete set. If the spur were short and if the end diameters of the spur were small, it might turn out that only sections 3 through 10, for example, might be required to enclose the spur with 1/8 inch space around it (in order that a 1/8 inch covering of rubber could be vulcanized to the spur). In that case, the central core assembly would be pushed to the right by the position-adjusting screw 44 until the right side of wafer #10 and the right side of the upper and lower sections of the mold were coextensive and the flange of the flange mount would be in contact with the surface thus formed. FIG. 3 shows how the cable and flange mount would be positioned in such a set-up.

The wafers 48 are kept together by rods or pins which are passed through pin holes 60 in the proper places in the wafers 48 and in the heat-conductive cable-sleeve blocks 30.

The lower half of the central core assembly fits into a semicircular groove 62 in the lower section of the mold. The upper half fits into a similar groove in the upper section. When the upper section is placed in position on the lower section, the wafers enclose a conically shaped internal cavity which has approximately a 15 degree taper.

The flange mount must be kept centered in the central-core-assembly spur cavity so that there is approximately a 1/8 inch space around the entire surface of the spur; it cannot be allowed to rest against the lower wafers. Thus, a flange-centering means of some type is necessary. The type employed here has a lower section 18 and an upper section 16, both having semicircular grooves in which a middle section 17, which comprises a holding member for the flange 38, is set. Various holding members are available to fit the various types and sizes of flange which are encountered in practice.

The upper and lower sections 16 and 18 of the flange-centering means are formed with holes for heaters 20, for fastening bolts 36 and for centering pins 35. Actually, it would be possible to dispense with the centering means shown and simply use a rod of metal cut to the proper size to prop up the flange mount in a centered position. However, this would not be as suitable as using the described centering means.

After cable and flange mount are placed in the proper position in the central core assembly (see FIG. 3), the top half of the central core assembly is placed over the bottom half; the top section of the mold is centered on the bottom section by means of the centering pins 58; the two parts are bolted together; the flange-centering means is put together and bolted to the mold; the heaters, thermostat and thermometer are placed in the proper holes, hooked up in the proper manner and electrical power is applied. When the proper temperature is reached, as determined by thermometer reading, strips of rubber are placed in the injector channel 54 and become semi-liquified. An injector screw is then screwed into the injector-screw block 62 and this action forces the rubber into the central core cavity around the spur and cable. The correct temperature is maintained by the thermostat for the proper period of time, after which the mold is allowed to cool. The vulcanized and bonded cable and flange mount are then removed and the rubber is trimmed smooth.

The reason that a heat-insulating cable-sleeve block is used is that it has been found that the cable insulation tends to bunch up if it is not employed.

It will be understood that various changes in the details, materials, and arrangements of part (and steps), which have been herein described and illustrated in order to explain the nature of the invention, may be made by those skilled in the art within the principle and scope of the invention as expressed in the appended claims.

I claim:
1. In a sectioned injection mold for vulcanizing a thermoplastic covering to the outside of the metallic tapered spur of a flange mount or like object and for fusing this covering with the thermo-plastic outer insulation of an electrical cable, said mold being formed with an injector channel, a removable central core assembly comprising a lower section and an upper section, said lower section comprising a cable-enclosing section and a spur-enclosing section adjacent thereto, said upper section being substantially a mirror image of said lower section, said spur-enclosing section being formed from a plurality of contiguous wafers each formed with a central, semicircular excision, said excisions being different in size, said wafers being selected from a large set in which the excisions are graduated in size over a predetermined range so that smaller sets of wafers can be selected from said large set to form tapered central cavities which can accommodate any of a number of differently sized tapered spurs with room for a thermoplastic covering for said spurs, some of said wafers being formed with excisions therein whereby, when a small set of wafers is assembled for use, a channel is formed through said wafer set from said injector channel to said tapered central cavity whereby heated rubber may be forced into said central cavity, said cable-enclosing section having a flat surface formed with a longitudinal groove therein for accommodating a cable and being selected from a set of such sections having the same outer dimensions but having groove dimensions which are graduated in size to accommodate cables having different outer dimensions, the selection of sets of wafers with suitable excisions and cable-enclosing sections with suitable grooves enabling variously sized tapered spurs and cables to be joined together with a thermoplastic covering.

2. The device of claim 1, wherein said wafers and cable-enclosing sections are fabricated from rigid, heat-conducting material such as aluminum.

3. The device of claim 1, wherein the taper of said conical cavity is substantially 15 degrees.

4. The device of claim 1, wherein said cable-enclosing section includes a second section similar to the first in shape, said first section and said mold being fabricated from a heat-conducting material such as aluminum, said second section being fabricated from a heat-insulating material such as formica, said heat-insulating section and the wafer section being on opposite sides of said first section, said heat-insulating sections being part of a set of such sections identical with the set of heat-conducting sections except for the material from which the two sets are fabricated.

5. The device of claim 1, including a third section adapted to be affixed to the flange portion of the flange mount which projects out of the mold, said third section comprising means for holding said flange mount in a centered position with respect to said internal cavity of said central core assembly.

References Cited

UNITED STATES PATENTS

| | | | |
|---|---|---|---|
| Re. 26,491 | 11/1968 | Colbert | 18—36 X |
| 2,454,193 | 11/1948 | Martin | 18—36 |
| 2,981,649 | 4/1961 | Metcalf | 18—5 |
| 3,280,432 | 10/1966 | Muller | 18—42 |
| 3,345,692 | 10/1967 | Cobaugh et al. | 18—36 |

FOREIGN PATENTS 1,241,818  10/1960  France.

WILBUR L. McBAY, Primary Examiner

U.S. Cl. X.R.

18—42